Patented Mar. 11, 1924.

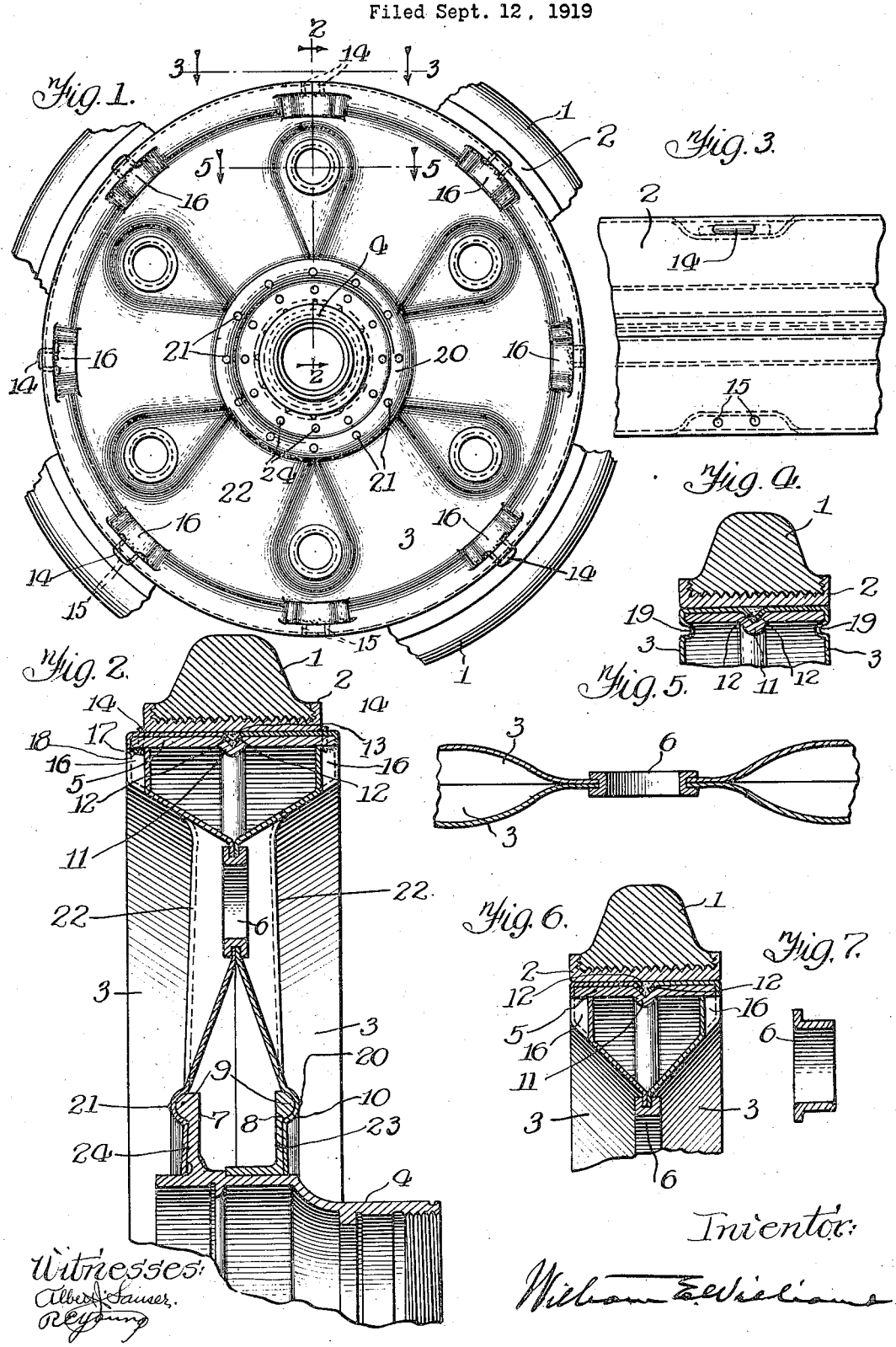

1,486,173

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

PRESSED-STEEL WHEEL FOR AUTOMOBILES.

Application filed September 12, 1919. Serial No. 323,314.

*To all whom it may concern:*

Be it known that I, WILLIAM ERASTUS WILLIAMS, a citizen of the United States, and resident of Chicago, in the county of Cook and State of Illinois, have invented a new and useful Improvement in Pressed-Steel Wheels for Automobiles, of which the following is a specification.

My invention relates to the class of wheels that are used for automobile trucks but may be used for other purposes as well.

The object of my invention is to provide a strong, light inexpensive metal wheel.

Reference will be had to the accompanying drawings in which Figure 1 is a front elevation of the wheel.

Figure 2 is a central cross section.

Figure 3 is a plan of a piece of the rim.

Figure 4 is a cross section through the rim, showing a modified form.

Figure 5 is a section on line 5—5 of Figure 1.

Figure 6 is a cross section through the rim showing another modification.

Figure 7 is a section of one of the eyelets used in holding the discs together.

In the drawing 1 indicates a solid rubber tire for a truck wheel and 2 indicates the metal base of the tire. These are of the ordinary type commonly used on trucks and are no part of my invention.

I prefer to make the web of my wheel out of two pressed steel discs, substantially alike as is indicated by 3 and these are secured to the hub 4, embrace a tread band 5 and are secured to each other by the thimbles or eyelet rings 6. Preferably, the hub 4 is made with an integral flange 7 and a flange 8 which is first secured to one of the discs 3 and then passed over the hub with such pressure that it is firmly seated. Each flange has an annular lateral rib 9 fitting closely in a co-acting rib groove 10 in the corresponding disc 3. The tread band 5 is provided with a groove 11 and after the parts are assembled the edges of the discs are pressed into the groove 12, securing the parts at this point where they are preferably further secured by known welding processes, fused metal being indicated at 13. By this means the parts are so securely united that the union will sustain heavy pressure employed in putting the tire in place.

The type of tire here shown upon the wheel is known as the "pressed on" type and to prevent accidental displacement I provide the staples 14 which are passed through holes 15 at intervals around the rim of the wheel as indicated by Figure 1. In this Figure 1 only a portion of the tire is shown.

The staples 14 are located in small recesses 16, which are punched and pressed in the rims of the discs in a manner to cause the metal of the discs at the points 17 to bear directly under the edges of the rim band 5 and thus support the latter from inward depression. When desired I weld this seam along the joints 17 as is indicated by 18 and this welding is done by a similar means to that employed at 13. When desired I roll or press in the sides of the discs as indicated at 19, Figure 4, in place of the recesses 16. In cases where the staples 14 are not used I make the tread no wider than the tire base as is indicated by Figure 6.

In assembling my wheel the two discs are secured to the flanges 7, 8, respectively, by welding at 20, 21, 23, 24, although other ways of fastening may be used. All the parts except the tire and its base are then placed in a die press, in proper sequence and forced over the hub, the rim band, and the eyelets 6, the latter being then riveted. The edges 12 are then secured as before noted and welds are made at 18, completing the assembly.

The holes in the eyelets 6 are large enough to allow a chain to be threaded through them and around the tire for the purpose of fastening anti-skid devices. The spaces between the eyelet holes indicated by 22, simulate the appearance of spokes and likewise greatly stiffen the discs because of the corrugated effect.

By fastening my discs to the hub 5, along the annular ribs 9 of the hub flanges and the ribs 10 of the discs, I obtain a much larger cross sectional area of metal of the discs where they join the hub than would be the case were I to make the fastening nearer the body of the hub. Disc wheels made of light sections of metal in the form of discs usually fail where they join the hub as not sufficient cross sectional area is obtained here unless the discs are made heavier than they need be to accommodate the service in the region of the rim. The use of the rim, tire band, and hub flanges with the discs attached to the outer marginal portions of the latter, distributes the load through an unusually large disc area and gives a large area of disc and hub contact for making a secure union, and thus permits the safe use of relatively thin disc stock.

The rim band 5 placed in my wheel as shown, becomes a stiffening arc and secured as indicated becomes a unitary member along with the discs, thus affording a very rigid tread for the wheel.

The eyelets, take the place of rivets or other fastenings sometimes used in disc wheels at this region of the wheel, and they afford the means of fastening the anti-skid chains as before mentioned.

The shoulders 17 of the recesses 16, or the recesses or grooves 19 transmit direct strut loads to the inside of the rim 5 in addition to such strains as are transmitted over the outside of the rim. These features together with the tension strains taken up by the outer flanges of the discs, make my wheel a strut and tension wheel combined, or in other words, the wheel has both the compression-resistance of a wheel with rigid spokes or disc and the tension-resistance of a wheel having light wire spokes.

What I claim is:—

1. The combination with a peripherally flanged hub and a metal tread band adapted to receive a metal tire base of ordinary type and having an external central peripheral groove, of two oppositely turned symmetrically similar metal disks engaging the hub in different planes, respectively, marginally engaging in said groove and secured therein by direct welding.

2. The combination with a hub and a broad relatively thick metal tread band centrally grooved peripherally and adapted to support a common metal tire base, of two wheel disks spaced at the hub, converging and joined together at some distance from the hub, diverging again, flanged inwardly over said band, bent marginally into said groove and integrally united by primarily fused metal filling the groove.

3. A wheel having two discs marginally spaced by a thick metal, tire supporting tread band each disc being provided with portions bent laterally into contact with the interior and exterior surfaces of the corresponding marginal portions of said band welded to the latter and centrally spaced by two rigid hub flanges.

4. A wheel having two discs secured together around a peripheral zone, a hub zone, and an intermediate zone, the peripheral union being through a tire-supporting metal tread band embraced by and welded to each disc, the hub union through a hub having flanges with lateral annular ribs embraced by disc ribs, and the intermediate union through eyelet rivets.

5. In a wheel of the class described, the combination with a hub having a circumferential flange immovable with respect to the hub and a pressed-on flange spaced from the immovable flange, both flanges being provided with lateral annular peripheral ribs, and two discs fitting over and welded to said ribs and peripherally connected by a member welded to each.

Signed at Chicago, in the county of Cook and State of Illinois, this ninth day of September, 1919.

WILLIAM ERASTUS WILLIAMS.

Witnesses:
B. J. BERNHARD,
JOHN B. JEFFERSON.